United States Patent Office 3,386,330
Patented June 4, 1968

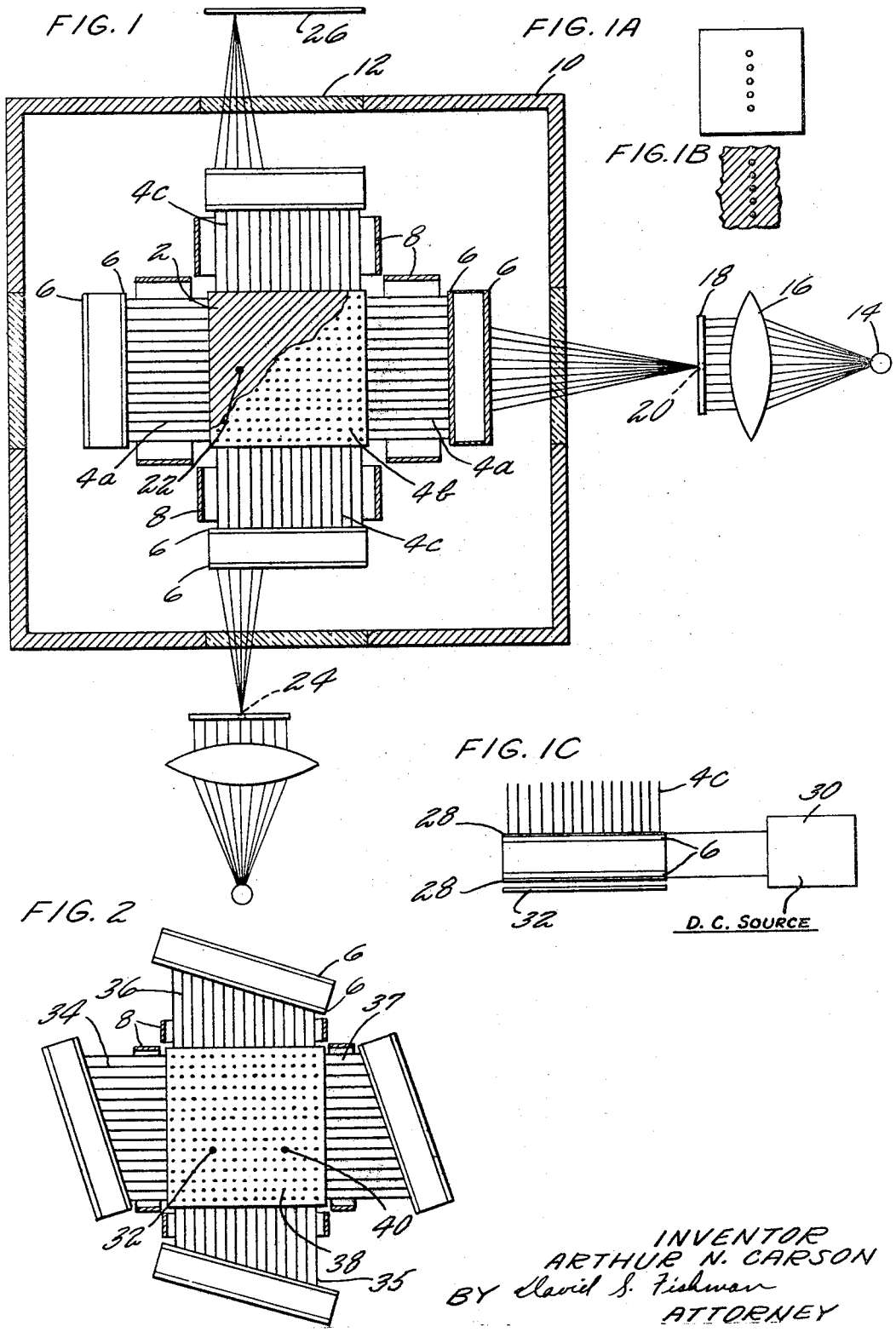

3,386,330
OPTICAL RANGE-FINDING DEVICE
Donald J. Burris, Broomfield, Colo., and Gene E. Stanley, Western Springs, Ill., assignors to Redfield Gun Sight Company, Denver, Colo., a limited partnership of Colorado
Filed June 22, 1964, Ser. No. 376,895
8 Claims. (Cl. 88—1)

ABSTRACT OF THE DISCLOSURE

This invention relates to a range-indicating variable-power riflescope based upon the principle that the average shooter knows the approximate dimensions of most targets and is, therefore, capable of making a comparison measurement whereby indicia within the riflescope's optical system of known dimension can be matched to a like dimension on the target and, in so doing, the range to the target is revealed. More specifically, non-magnifying indicia within the second focal plane of the optical system in a variable power riflescope is superimposed upon an image of the target and the size of the target image is increased or decreased until said indicia brackets a dimension on the target substantially equal to that predetermined dimension said indicia is designed to indicate. Once the foregoing condition is achieved, an index mark within the optical system, preferably in the form of a field stop diaphragm, shows the range to the target on a range scale located in the forward image plane that varies in apparent size along with the target image.

---

High velocity ammunition used in modern rifles has extended their effective range to well over five hundred yards even though few marksmen know how to handle shots at this distance. On the other hand, accurate shooting at three or four hundred yards is becoming quite commonplace among skilled riflemen. Those less skilled are taking shots at these distances although their proficiency is not what it should be and much game has been wounded and allowed to wander away and die rather than being cleanly killed. Thus, if hunters are going to continue to shoot at targets several hundred yards away, it is important that they be provided with the means to do so more accurately.

One of the main problems connected with long-range marksmanship, especially in rolling country, is the inability of the average person to estimate the distance to the target with any accuracy whatever. Up to a hundred yards or so, most people can estimate distance fairly well, at least accurately enough to register a "kill" on a target within this range. At distances of two or three hundred yards, on the other hand, many range estimates are in error by over a hundred yards which, of course, makes accurate shooting impossible.

One reason for the popularity of the long-range shot has been the increasing use of telescopic sights on high-powered rifles in place of the customary open or "iron" sights. In all probability riflescopes have done little to improve the user's ability to estimate distances, in fact, scopes could well have lessened it because the magnified "scope-image" influences one's judgment to the extent that a target is almost always thought to be much closer than it actually is. Variable power riflescopes, wherein the degree of magnification can be changed over a rather wide range, further complicate the problem as no definite yardstick remains by which the hunter can rely on his past experience to judge the distance to a given target because of the area of the riflescope's field of view it occupies in relation to other similar targets.

The need is not so much for a true "rangefinder" as the term is commonly employed which will give an accurate distance measurement as it is for a device that will provide a "reasonable indication" or "estimate" of the range in question. For instance, a distance estimating device that will give an indication that a target is 300 yards away but may be in error by ±30 yards or about 10% is still a tremendous improvement and a more accurate ranging device is seldom needed under field conditions. There are several reasons for this, one being that the elevation correction control of the iron sight or riflescope is probably incapable of introducing changes in the trajectory of the bullet in increments as small as twenty-five yards one way or another. Variations in ammunition can also account for certain inaccuracies. Perhaps most significant from the practical standpoint is the fact that the change in the point of impact of a bullet at 200 yards compared with 300 yards is only a few inches which is probably better than the hunter can expect of his own ability with a hand-held rifle shot. By way of example, a .30–06 is a popular hunting rifle and it has a muzzle velocity of about 3000 ft./sec. using 180 grain ammunition. At 300 yards, the bullet will drop less than seven inches and at 200 yards nearly three inches. Thus, if the range-estimating device was off ±50 yards and indicated the target to be 250 yards away, the maximum point-of-impact error would be only 1.5 inches. There are, of course, many rifles that have much flatter trajectories than the one above-mentioned.

It has now been found that a range-estimating device answering the above requirements can be incorporated into a variable power riflescope with only minor changes being required. By locating the reticle in the second image plane where it does not change size as the magnification is changed to vary the size of the target image, a relationship is established that can be used to produce a visual indication of the approximate range. In other words, a target of known size will vary in the extent to which it fills the field of view depending upon the degree to which the target-image is magnified, and by equating this changing target-image to a fixed reference that does not change, one can determine range with reasonable accuracy when the foregoing relationship is translated into terms of yardage. By locating the yardage scale in the first image plane where it appears to change size along with the target-image, the diaphragm in the second image plane can be used to block out portions of the scale at successively greater magnifications thus providing a direct range reading without taking the eye away from the riflescope eyepiece.

Accordingly, it is the principal object of the present invention to provide a novel and improved variable-power riflescope that includes a range-estimating feature.

A second objective is the provision of a device of the type aforementioned which does not interfere with normal operation of either the scope or firearm, but instead, enhances their utility.

Another object of the invention is to provide means whereby the novice rifleman can arrive at a much closer approximation of the range to a given target than he would likely be able to do with his unaided eye.

Still another objective of the invention forming the subject matter hereof is the provision of range-indicating indicia in a variable-power riflescope that requires only minor additions to the existing structure and no change in the optical system.

An additional object is to provide a variable-power telescopic sighting device that facilitates more accurate shooting and enables longer shots to be taken with greater assurance of a clean kill.

Further objects are to provide a range-indicating riflescope that is rugged, inexpensive, reasonably accurate, easy to use, fast and does not change the over-all appearance, function, weight or size of the ordinary variable-power scope.

Other objects will be in part apparent and in part pointed out specifically hereinafter in connection with the description of the drawings that follows, and in which:

FIGURE 1 is a longitudinal diametrical section of the variable-power riflescope incorporating the range-indicating feature;

FIGURE 2 is an enlarged fragmentary longitudinal diametrical section showing the distance scale and redesigned reticle more clearly;

FIGURE 3 is a further enlarged fragmentary elevation of the range or distance scale as viewed in the direction of the arrow in FIGURE 2;

FIGURE 4 is a schematic illustrating the manner in which the erectors, reticle, distance scale and diaphragm cooperate to indicate the range to a far-away object at a high magnification;

FIGURE 5 is a schematic similar to FIGURE 4 showing the same far-away object when viewed at low-power;

FIGURE 6 is a schematic similar to FIGURE 5 except that the target is closer and being viewed at low power;

FIGURE 7 is an enlarged elevation showing the view seen by the user through the eyepiece under the same conditions as exemplified in FIGURE 4; and FIGURE 8 is an enlarged elevation like FIGURE 7 showing the eyepiece view under the conditions of FIGURE 6.

Referring now to the drawings for a detailed description of the present invention and, initially, to FIGURES 1 and 2 for this purpose, it will be seen that reference numeral 10 has been used to broadly designate a variable power riflescope of the type having an objective lens 12, an eyepiece lens system 14, and an erector lens system 16, all of which cooperate to produce a magnified image of a distant target. Objective lens 12 is mounted in externally threaded lens mount 18 that is screwed into the outer extremity of flared tube 20. A collar 22 forming an extension of flared tube 20 shades the objective.

The inner end of tube 20 screws into the main barrel 24 which houses the erector lens system 16, the windage and elevation correction system 26, the power ring 28 and associated elements used to vary the spacing between the erectors and change the degree of magnification. The eyepiece lens system 14 is housed in a flared tube 30 screwed onto the rear end of the barrel and locked in place by a lock ring 32. Adjustment of the eyepiece relative to the second image plane containing the reticle 32 can be made to accommodate differences in the user's vision.

Optically, the scope is conventional in that the objective lens 12 reproduces an inverted image of a distant target in the first image A—A where collector lens 34 picks it up and functions to concentrate the light rays passing onto the erectors 36 and 38 that reinvert the image. After passing through the erectors, the upright image of the target is reproduced in a second image plane B—B where the eyepiece lens system views same.

In the particular form shown, both erectors 36 and 38 are compound lenses fastened in separate mounts 40 and 42 that are, in turn, mounted for longitudinal movement in erector lens tube 44. This erector lens tubs 44 is mounted within the main barrel for limited universal movement on an elastic ring 46 such that the center of universal movement lies substantially in the second image plane. A leaf spring 48 biases the erector lens tube against the windage and elevation adjustment screws 26, only one of which is shown, that swing the erector lenses, collector lens 34 and the reticle 32 housed therein about the axis of universal movement. Such windage and elevation correction mechanisms are, likewise, common in rifle-scopes.

Now, to accomplish the change in degree of magnification of the target image in a variable-power riflescope, the image in the first image plane produced by the objective lens 12 is magnified by the erectors in varying degrees depending upon their distance from one another and from the objective. Power ring 28, which is accessible on the outside of the main barrel, is turned and operatively connected to a sleeve 50 that encircles the erector lens tube. Sleeve 50 has angular slots 52 and 54 therein that receive pins 56 and 58 connected to the erector lens mounts 40 and 42. These pins pass through a longitudinal slot 60 in the erector lens tube. It can thus be seen that as powder ring 28 is turned, it will act through sleeve 50 to change the spacing between the erectors and also move them longitudinally relative to the objective. This mechanism is more fully described in U.S. application Ser. No. 173,922 filed Feb. 19, 1962, now U.S. Patent 3,161,716.

As in the aforementioned application, it is of utmost importance to teh present invention that the reticle 32 be located in the second image plane where its apparent size remains constant irrespective of the degree of target magnification. Also, the diaphragm 62 is mounted in the second image plane and its aperture is selected such that the inside surfaces of the erector lens tube and main barrel cannot be seen through the eyepiece regardless of the degree of magnification. Up to this point, all elements of the variable power riflescope are common to the scope forming the subject matter of the copending application previously identified.

Next, with reference to FIGURES 1, 2, 4, 5 and 6 of the drawing it would, perhaps, be helpful to explain briefly how the optical system operates at low and high degrees of magnification as this information becomes quite important to an understanding of the range-indicating feature to be described presently. In diagrams 4 and 5, for example, the target has been represented by arrow 64 which, for purposes of illustration, will be considered as lying about 450 yards away. Irrespective of the position of erectors 36 and 38, the inverted image 66 of the arrow produced in the first image plane A—A will be the same size as shown because all magnification variations occur behind this first image plane. Before proceeding it would be well to mention that for purposes of simplicity of illustration, the two erectors 36 and 38 have been represented in FIGURES 4, 5 and 6 by a single lens element.

Now, with the erectors close together and nearest to the objective lens 12 as shown in FIGURE 4, a highly magnified erected image 68 of the target is reproduced in the second image plane B—B. As shown, the image 68 fills the entire field of view visible through diaphragm 62. It should be noted, however, that the full-sized image 68 is several times larger than what is seen through the eyepiece because the diaphragm aperture lets the viewer only see the central portion of the image. If the eyepiece was capable of covering the entire image and also assuming such elements as the erector lens tube, erector mounts and main barrel were so designed as to not act as diaphragms therefor, the field of view would always remain the same irrespective of the degree of magnification although at high-power the edge sharpness would be poor. Accordingly, the diaphrgam lets the user look at only part of the image at the higher powers thus seemingly narrowing the field of view.

In FIGURE 5, the same target is being sighted upon at the same distance but at minimum magnification. Here the inverted image in the first image plane is the same and moving the erectors 36 and 38 away from the objective reduces the apparent size of the target as at 68a to approximately one-third the size it was at high-power assuming the range of magnification is, for example, 3× to 9×. In the FIGURE 5 situation, the actual target image 68a does not fill the field of view as was the case in FIGURE 4 so that the viewer would see a much wider expanse around the target. Saying this another way, the user would in FIGURE 5 be able to see nearly all of the target area reproduced in the first image plane by the objective and the diaphragm would cause very little, if any, vignetting thereof. At low power, of course, the edge sharpness is much improved.

The above-described change in the field of view at different magnifications is made use of in the range-indicating feature of the present invention as will now be described. If a small scale 70 is placed inside the erector lens tube in inverted position and located longitudinally so as to lie in the first image plane A—A, it will appear erect and in focus at all degrees of magnification. Note, however, that because this scale lies in the first image plane, its apparent size will increase along with the magnification and proportionately to the change in apparent size of the image as the latter is seen in the second image plane. Thus, at low-power (FIGURES 5 and 6) the scale will appear quite small and at high-power (FIGURE 4) fairly large. More significant, however, is the fact that at low-power the entire scale is visible because the diaphragm lets the user see the entire field of view; whereas, at high-power, the diaphragm narrows the field of view to the extent that only the tip of the scale nearest the optical axis of the scope is visible. FIGURE 7 corresponds to FIGURE 4 and shows only the tip of the scale 70 visible at the extreme magnification of, say, nine power. FIGURE 8, on the other hand, corresponds to FIGURES 5 and 6 and shows the whole scale 70 can be seen at low power, say, 3×

In FIGURE 3 an enlarged view of the scale 70 has been shown and it will be seen to have inscribed thereon various ranges from 150 yards up to 450 yards. As the range gets larger, the actual size of the numerals gets smaller so that the numeral "450" is roughly one-third the size of the "150." On the other hand, both these numerals appear the same size in FIGURES 7 and 8 because the "150" is only visible at minimum power and when the "450" alone can be seen it has been magnified to three times its original size.

The remaining problem is, of course, to make use of this scale as an indication of target distance or range. The reticle 32, as already mentioned, lies in the second image plane B—B where its apparent size remains constant at all degrees of magnification. By merely adding to this reticle a pair of vertically-spaced horizontal cross-hairs 72 at a position such that they do not interfere with normal sighting operations, they provide the missing essential of a range indicating device. The spacing between these cross-hairs is not critical other than the fact that the vertical distance they extend on a target must be known quite accurately. For practical reasons, namely, that the vital area on most big game animals is about 18 inches high, these cross-hairs are spaced apart to subtend an 18 inch vertical target area.

Under actual hunting conditions it is seldom possible to range on the game itself because the animal is not likely to stand still for any appreciable length of time. While this may occur on occasion, it is still wiser to perform the ranging operation in advance and be prepared for the fast shot. To do so, the hunter selects a fixed target which he knows to be about 18 inches high. For example, in walking to his hunting station he will undoubtedly pass a stump or rock of the desired size somewhere in the vicinity of where he expects his game to appear. Then, when he reaches his "stand," he can sight on this 18 inch object and attempt to fit it exactly between the parallel cross-hairs 72 of the scope reticle. By turning the power ring 28, he can increase or decrease the size of the object as necessary until it fits between the cross-hairs. FIGURE 7 shows how a boulder 74 might appear and FIGURE 8 shows a tree stump 76 being used for the same purpose. Once the fixed object is placed in the proper relation to the cross-hairs, the lowest number visible on the scale 70 will indicate its distance. The boulder 74 in FIGURE 7 is 450 yards away, whereas, the stump 76 in FIGURE 8 is only 150 yards away. In this manner, the hunter is able to establish one or more fixed reference points from which he can easily and quickly estimate the range to an actual target with reasonable accuracy. For instance, if a deer were to walk into a clearing in the vicinity of the boulder 74 in FIGURE 7, it would be a simple matter to tell whether the animal were nearer or farther than this reference object and approximately how far behind or in front of it. If the animal was nearer by, say, 50 yards, the hunter would sight in at 400 yards and take his shot. Even if his estimate was off by 50 yards one way or another, the trajectory of a high-powered big game rifle is such that he would miss his point of aim only a few inches and this error is oftentimes enough to register a clean kill or at least a hit near a vital area which will prevent the animal from moving far. Under proper circumstances, it is, of course, possible to range directly on the animal should it be grazing or standing relatively quiet for some other reason thus eliminating all judgement error in estimating the distance relative to the reference object.

Having thus described the several useful and novel features of the improved variable-power riflescope of the present invention, it will be apparent that the many worthwhile objectives for which it was developed have been achieved. Although but a single specific embodiment of the invention has been illustrated and described in detail herein, we realize that certain changes and modifications may well occur to those skilled in the art within the broad teaching hereof; hence, it is our intention that the scope of protection afforded hereby shall be limited only insofar as said limitations are expressly set forth in the appended claims.

What is claimed is:

1. An optical range-finder which comprises: a barrel, objective lens means located in the forward end of the barrel and adapted to reproduce an inverted image of a distant real object in a first image plane spaced rearwardly thereof, erector lens means mounted in the barrel for axial movement to the rear of the first image plane and adapted to reproduce an erect image of the real object in a second image plane spaced therebehind at varying degrees of magnification, eyepiece lens means located in the rear end of the barrel adapted to focus upon the erect image in the second image plane, reticle means mounted in the barrel at the second image plane carrying fixed-spaced reference indicia capable of being superimposed upon the erect image in said second image plane, the spacing between said reference indicia being selected to bracket a pre-determined and known linear dimension on the erect image of the reel object as the latter appears in the second image plane at a single degree of magnification lying between the maximum and minimum magnification limits of the erector lens means, indexing means, and scale means including distance indicating indicia correlated to changes in the degree of magnification of the erect image in the second image plane and to the reference indicia, said scale means being located forwardly of the erector lens means in position to have the image thereof reproduced at varying degrees of magnification by the latter, said indexing means being located behind said erector lens means in position such that said scale means appears to shift relative thereto as the magnification of the latter is varied, and said distance-indicating scale indicia being adapted to cooperate with the indexing means to reveal the distance to the real object when the known linear distance thereon corresponding to the pre-determined spacing of the reference indicia exactly fits therebetween upon varying the degree of magnification of the erect image thereof in the second image plane.

2. The optical range finder as set forth in claim 1 in which: the scale means is located inside the barrel in inverted position at the first image plane where the erect image thereof appearing in the second image plane will be magnified in proportion to the erect image of the real object, and in which the indexing means comprises a diaphragm located in the barrel at the second image plane, said diaphragm having an aperture therein sized to limit the field of view in the second image plane at all degrees of magnification greater than the minimum, said diaphragm and scale means cooperating such that the lowest distance-indicating scale indicia seen in the second image plane indicates the distance to the real object when the known linear dimension thereof corresponding to the predetermined spacing between the reference indicia is exactly bracketed thereby.

3. The optical range finder as set forth in claim 2 in which the size of the distance-indicating scale indicia decreases successively as the value thereof decreases, the relative size of said distance-indicia being selected such that the lowest visible one has approximately the same image size at all degrees of magnification as viewed in the second image plane.

4. The optical range finder as set forth in claim 2 in which the reference indicia comprise a pair of spaced parallel horizontal lines.

5. The optical range finder as set forth in claim 2 in which: the ratio of maximum to minimum magnification is approximately 3:1, the lowest valued distance-indicating scale indicia is approximately three times the size of the highest valued one, and the intermediate distance-indicating scale indicia values have a proportionately greater size between the maximum and minimum values in inverse relation to their ordinal value.

6. The optical range finder as set forth in claim 2 in which the diaphragm restricts the field of view in the second image plane at maximum magnification to approximately one-third the field of view at minimum magnification.

7. The optical range finder as set forth in claim 3 in which: the ratio of maximum to minimum magnification is approximately 3:1, the lowest valued distance-indicating scale indicia is approximately three times the size of the highest valued one, and the intermediate distance-indicating scale indicia values have a proportionately greater size between the maximum and minimum values in inverse relation to their ordinal value.

8. The optical range finder as set forth in claim 5 in which the ratio of the highest valued distance-indicating scale indicia to the lowest-valued is the same as the ratio of the maximum to minimum magnification.

References Cited

UNITED STATES PATENTS

| | | | |
|---|---|---|---|
| 975,682 | 11/1919 | Ferber. | |
| 2,800,718 | 7/1957 | Benford | 33—50.5 |
| 2,811,894 | 11/1957 | Braker | 88—1 |
| 3,161,716 | 12/1964 | Burris et al. | 350—10 X |

DAVID H. RUBIN, *Primary Examiner.*

T. H. KUSMER, *Assistant Examiner.*